(12) United States Patent
Filip

(10) Patent No.: US 9,473,745 B2
(45) Date of Patent: Oct. 18, 2016

(54) SYSTEM AND METHOD FOR PROVIDING LIVE IMAGERY ASSOCIATED WITH MAP LOCATIONS

(71) Applicant: Google Inc., Mountain View, CA (US)

(72) Inventor: Daniel Joseph Filip, San Jose, CA (US)

(73) Assignee: Google Inc., Mountain View, CA (US)

( * ) Notice: Subject to any disclaimer, the term of this patent is extended or adjusted under 35 U.S.C. 154(b) by 276 days.

(21) Appl. No.: 14/168,494

(22) Filed: Jan. 30, 2014

(65) Prior Publication Data

US 2015/0215585 A1 Jul. 30, 2015

(51) Int. Cl.
*H04N 7/18* (2006.01)
*G09B 29/00* (2006.01)

(52) U.S. Cl.
CPC ............. *H04N 7/18* (2013.01); *G09B 29/007* (2013.01)

(58) Field of Classification Search
CPC .......... G06Q 99/00; G06T 7/00; H04N 7/18; A01H 5/10; C07K 14/415; C12N 15/8245; G09B 29/007
USPC ........................................................ 348/148
See application file for complete search history.

(56) References Cited

U.S. PATENT DOCUMENTS

| | | | | |
|---|---|---|---|---|
| 7,096,428 B2* | 8/2006 | Foote | .................. | G06F 3/04815 707/E17.018 |
| 8,527,340 B2* | 9/2013 | Fisher | .................... | G06Q 30/02 455/456.1 |
| 8,964,298 B2* | 2/2015 | Haddick | ................. | G06F 3/013 359/630 |
| 9,020,832 B2* | 4/2015 | Fisher | .................... | G06Q 30/02 705/14.1 |
| 2002/0140745 A1* | 10/2002 | Ellenby | .................. | G01C 21/20 715/848 |
| 2003/0220835 A1* | 11/2003 | Barnes, Jr. | ......... | G06Q 10/1053 705/14.36 |
| 2006/0271287 A1* | 11/2006 | Gold | ...................... | G01C 21/26 701/426 |
| 2007/0162922 A1* | 7/2007 | Park | ....................... | H04N 19/33 725/10 |
| 2007/0198182 A1* | 8/2007 | Singh | ................. | G01C 21/3647 701/431 |
| 2009/0135178 A1* | 5/2009 | Aihara et al. | ................. | 345/419 |
| 2010/0061701 A1* | 3/2010 | Iwane | ................... | G06T 3/0062 386/241 |
| 2010/0115411 A1* | 5/2010 | Sorokin | ................ | G03B 37/04 715/723 |
| 2010/0146397 A1* | 6/2010 | Koch et al. | .................. | 715/739 |
| 2010/0245538 A1* | 9/2010 | Marzano | ................. | H04N 7/15 348/14.12 |

(Continued)

FOREIGN PATENT DOCUMENTS

EP 2126722 A2 12/2009
EP 2460130 A2 6/2012

(Continued)

*Primary Examiner* — Shan Elahi
(74) *Attorney, Agent, or Firm* — Lerner, David, Littenberg, Krumholz & Mentlik, LLP

(57) ABSTRACT

Near real-time imagery of a given location may be provided to user upon request. Most popularly viewed geographic locations are determined, and a 360 degree image capture device is positioned at one or more of the determined locations. The image capture device may continually provide image information, which is processed, for example, to remove personal information and filter spam. Such image information may then be provided to users upon request. The image capture device continually captures multiple views of the given location, and the requesting user can select which perspective to view.

17 Claims, 6 Drawing Sheets

(56) References Cited

U.S. PATENT DOCUMENTS

| | | | | |
|---|---|---|---|---|
| 2011/0199479 A1* | 8/2011 | Waldman | | G01C 21/3602 348/116 |
| 2011/0242271 A1* | 10/2011 | Ogale | | H04N 13/0011 348/36 |
| 2012/0200743 A1* | 8/2012 | Blanchflower | | H04N 21/254 348/239 |
| 2012/0218412 A1* | 8/2012 | Dellantoni | | G01C 21/3602 348/148 |
| 2012/0233000 A1* | 9/2012 | Fisher | | G06Q 30/02 705/14.71 |
| 2012/0249797 A1* | 10/2012 | Haddick | | G06F 1/163 348/158 |
| 2012/0281911 A1* | 11/2012 | Fung | | G06K 9/00677 382/165 |
| 2013/0040660 A1* | 2/2013 | Fisher | | G06Q 30/02 455/456.1 |
| 2013/0127980 A1* | 5/2013 | Haddick | | G06F 3/013 348/14.08 |
| 2013/0278631 A1* | 10/2013 | Border | | G02B 27/017 345/633 |

FOREIGN PATENT DOCUMENTS

| | | |
|---|---|---|
| EP | 2646964 A2 | 10/2013 |
| WO | 0044169 A1 | 7/2000 |
| WO | 2008039763 A2 | 4/2008 |
| WO | 2008097917 A2 | 8/2008 |
| WO | 2011014853 A2 | 2/2011 |
| WO | 2012074359 A1 | 6/2012 |
| WO | 2012075335 A2 | 6/2012 |
| WO | 2013086739 A1 | 6/2013 |

\* cited by examiner

SYSTEM AND METHOD FOR PROVIDING LIVE IMAGERY ASSOCIATED WITH MAP LOCATIONS

BACKGROUND

Upon request, map data for a given location and associated imagery may be provided to a user. Such associated imagery is typically captured by a vehicle-mounted camera as the vehicle drives through the given location, and then stored in a database. Because of the passage of time between image capture and providing the image to the user, the imagery may depict information that is irrelevant or out of date. For example, the imagery may depict construction that is no longer ongoing, or a business that is no longer operational.

SUMMARY

Near real-time imagery of a given location may be provided to user upon request. Most popularly viewed geographic locations may be determined, and a 360 degree image capture device may be positioned at such locations. The image capture device may continually provide image information, which is processed, for example, to remove personal information and filter spam. Such image information may then be provided to users upon request. Because the image capture device continually captures multiple views of the given location, the requesting user can select which perspective to view.

One aspect of the disclosure provides a computer-implemented method for providing live imagery to users upon request. In this method one or more computing devices receive live images of a geographical location from at least one image capture device, and process the received live images. Further, the one or more computing devices receive a request for map data corresponding to the geographical location, and provide the requested map data. The one or more computing devices further receive a request for live imagery corresponding to the requested map data, and determine, based on the request for live imagery, a point of view associated with the requested live images. The one or more computing devices provide processed live images corresponding to the determined point of view and the requested map information. According to one example, the one or more computing devices further determine geographical locations for which imagery is most often requested by users, and the image capture device is positioned at the determined geographical location. The received images may include a continuous 360 degree field of view around the image capture device. Processing the received live images may include detecting personal information, such as human faces and license plate numbers, and blurring the detected personal information. Alternatively or additionally, processing the received images may include filtering spam data.

Another aspect of the disclosure provides a system comprising at least one image capture device positioned at a geographical location, and one or more processors in communication with the image capture device. The one or more processors are programmed to receive live images of a geographical location from at least one image capture device, process the received live images, receive a request for map data corresponding to the geographical location, provide the requested map data, receive a request for live imagery corresponding to the requested map data, determine, based on the request for live imagery, a point of view associated with the requested live images, and provide processed live images corresponding to the determined point of view and the requested map information.

Yet another aspect of the disclosure provides a non-transitory computer-readable medium storing information and instructions executable by a processor. When executed, the instructions perform a method comprising receiving live images of a geographical location from at least one image capture device, processing the received live images, receiving a request for map data corresponding to the geographical location, and providing the requested map data. This method further includes receiving a request for live imagery corresponding to the requested map data, determining, based on the request for live imagery, a point of view associated with the requested live images, and providing processed live images corresponding to the determined point of view and the requested map information.

DETAILED DESCRIPTION

Overview

Upon request by a user, live imagery of a given location may be provided to the user over the Internet in association with map data for the given location. For example, an image capture device may be positioned at the given location and may continually provide imagery to one or more computing devices. The one or more computing devices process the imagery to, for example, remove personal information (e.g., faces and/or license plate numbers) and filter spam. A user may request map data for the given location, and may also request live imagery of the given location. In response to the request, the one or more processors provide the processed live images associated with the requested map data.

The image capture device may be, for example, a 360 degree video camera. In this regard, the image capture device may continually capture a 360 degree field of view around the image capture device. According to one example, in requesting the live imagery, the user may specify a viewpoint for the imagery. For example, the user may submit directional information with the request for imagery, and in response receive a segment of the captured imagery.

Positioning of the image capture device may be determined based on popularity. For example, the one or more computing devices may determine for which geographical locations the most requests for map data or imagery are received. Image capture devices may be positioned at the determined locations. Preferably, the image capture devices are positioned so as to prevent tampering.

The processing performed on the captured images may be automated. For example, the one or more processors may automatically detect personal information, such as faces, license plates, or other information. In response to detecting such information, the one or more processors blur or otherwise obscure the information such that it is not provided to a user in response to a request. Moreover, the one or more processors may detect and filter spam. For example, it may be determined that images from an unauthorized image capture device or other unauthorized content are being received in addition to or in place of approved images. Accordingly, the unauthorized content and images may be filtered.

Example System

Figure 1:
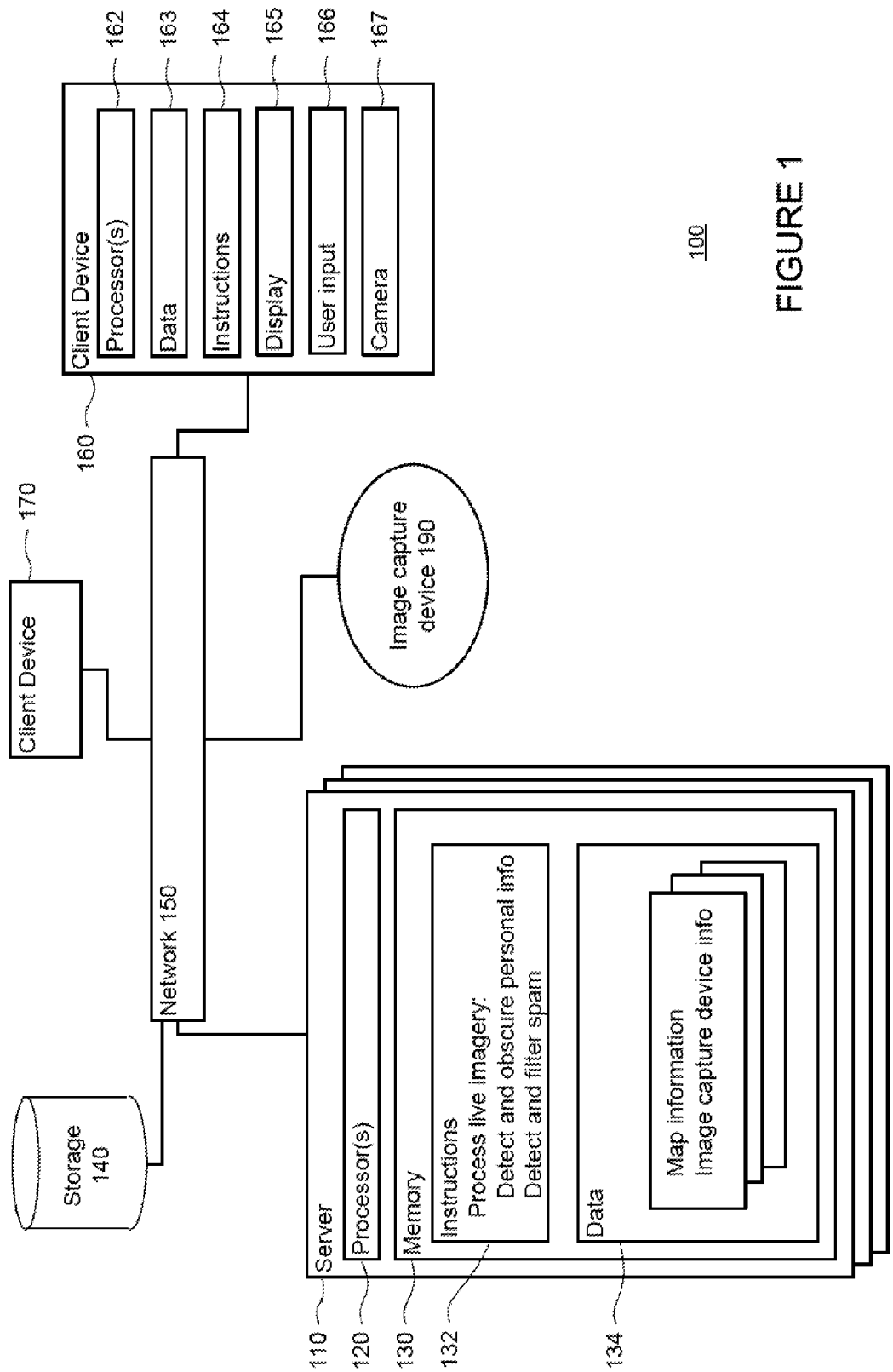
FIG. 1 is a functional diagram of a system in accordance with aspects of the disclosure.
Figure 2:
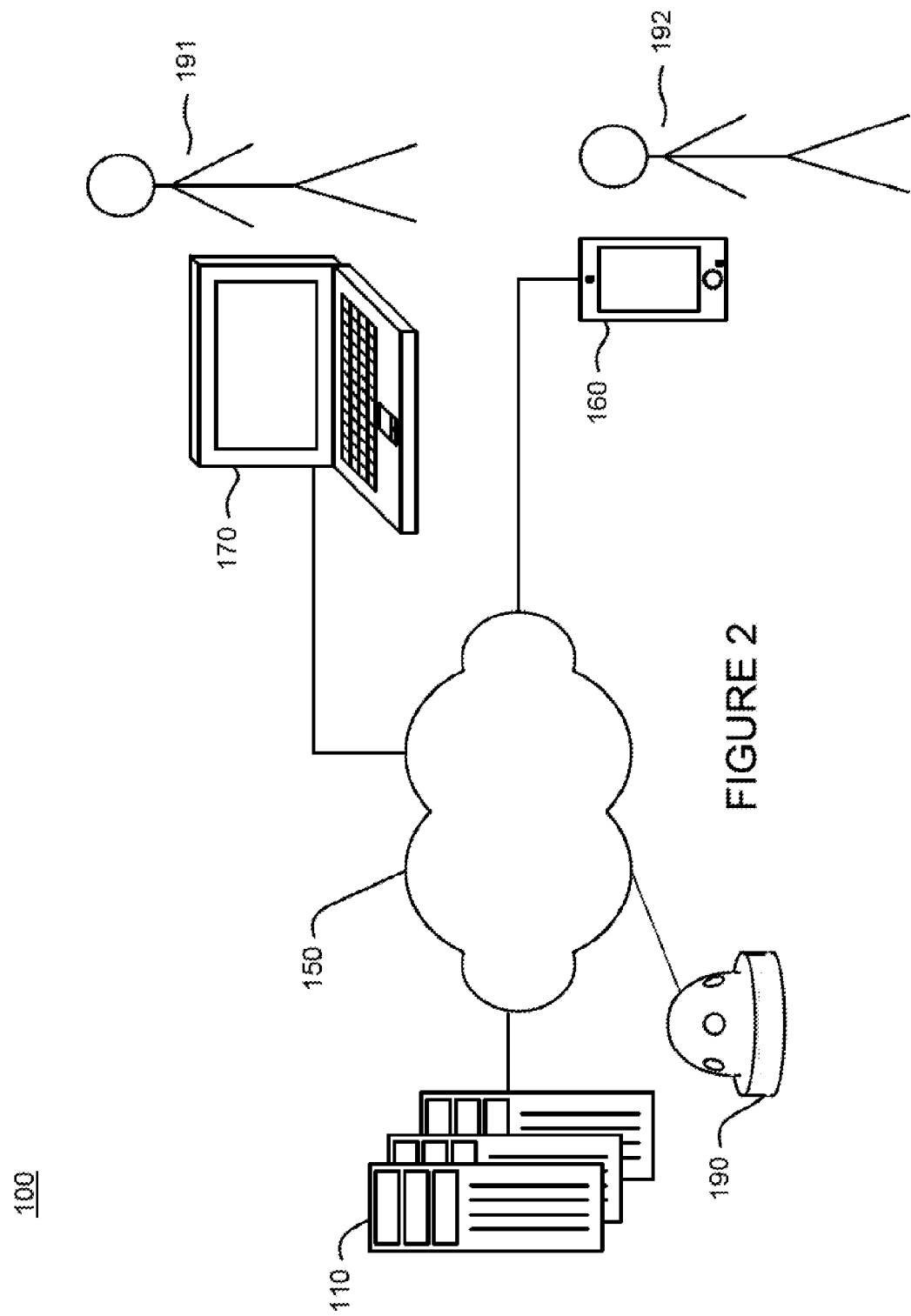
FIG. 2 is a pictorial diagram of the system of FIG. 1.

FIGS. 1 and 2 include an example system 100 in which the features described above may be implemented. It should not be considered as limiting the scope of the disclosure or usefulness of the features described herein. In this example, system 100 can include one or more computing devices 110, which may be connected to further computing devices 160 and 170 over a network 150.

Computing devices 110 can contain one or more processors 120, memory 130 and other components typically present in general purpose computing devices. The memory 130 can store information accessible by the one or more processors 120, including instructions 132 that can be executed by the one or more processors 120.

Memory 130 can also include data 134 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 132 can be any set of instructions to be executed directly, such as machine code, or indirectly, such as scripts, by the one or more processors. In that regard, the terms "instructions," "application," "steps" and "programs" can be used interchangeably herein. The instructions can be stored in object code format for direct processing by a processor, or in any other computing device language including scripts or collections of independent source code modules that are interpreted on demand or compiled in advance. The instructions 132 can be executed to perform operations such as detecting personal information in received images, modifying the received images to blur or obscure such information, or the like. The instructions 132 may also be executed to perform spam detection and filtering. Functions, methods and routines of the instructions are explained in more detail below.

Data 134 can be retrieved, stored or modified by the one or more processors 120 in accordance with the instructions 132. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data. According to one example, the data may include map information for geographical locations. Moreover, the data 134 may include information related to image capture device 190, such as an identifier and location information.

The one or more processors 120 can be any conventional processors, such as a commercially available CPU. Alternatively, the processors can be dedicated components such as an application specific integrated circuit ("ASIC") or other hardware-based processor. One or more of computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For instance, the memory can be a hard drive or other storage media located in housings different from that of the computing devices 110. As another example, various methods described below as involving a single component (e.g., processor 120) may involve a plurality of components (e.g., multiple computing devices distributed over a network of computing devices, computers, "racks," etc. as part of a parallel or distributed implementation). Further, the various functions performed by the embodiments may be executed by different computing devices at different times as load is shifted from among computing devices. Similarly, various methods described below as involving different components (e.g., device 110 and device 160) may involve a single component (e.g., rather than device 160 performing a determination described below, device 160 may send the relevant data to device 110 for processing and receive the results of the determination for further processing or display). Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 150.

Each of the computing devices 110 can be at different nodes of the network 150 and capable of directly and indirectly communicating with other nodes of network 150. Although only a few computing devices are depicted in FIGS. 1-2, it should be appreciated that a typical system can include a large number of connected computing devices, with each different computing device being at a different node of the network 150. The network 150 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, each of the computing devices 110 may include web servers capable of communicating with a storage system 140, image capture device 190, and computing devices 160, 170 via the network 150. For example, one or more of server computing devices 110 may receive live imagery from the image capture device 190 through the network 150, and may further transmit processed imagery to the client devices 160, 170 using the network 150. As another example, one or more of server computing devices 110 may use network 150 to transmit and present information to a user, such as user 191, 192, on a display, such as displays 165 of computing devices 160, 170. In this regard, computing devices 160, 170 may be considered client computing devices and may perform all or some of the features described herein.

Each of the client computing devices 160, 170 may be configured similarly to the server computing devices 110, with one or more processors 162 and memory, including data 163 and instructions 164 as described above. Each client computing device 160, 170 may be a personal computing device intended for use by a user 191, 192 and have all of the components normally used in connection with a personal computing device such as a central processing unit (CPU), memory (e.g., RAM and internal hard drives) storing data and instructions, a display 165 (e.g., a monitor having a screen, a touch-screen, a projector, a television, or other device that is operable to display information), and user input device 166 (e.g., a mouse, keyboard, touch-screen or microphone). The client computing device may also include a camera 167 for recording video streams, speakers, a network interface device, and all of the components used for connecting these elements to one another.

Although the client computing devices 160, 170 may each comprise a full-sized personal computing device, they may alternatively comprise mobile computing devices capable of wirelessly exchanging data with a server over a network such as the Internet. By way of example only, client computing device 160 may be a mobile phone or a device such as a wireless-enabled PDA, a tablet PC, or a netbook that is capable of obtaining information via the Internet. In another example, client computing device 170 may be a head-mounted computing system. As an example the user may input information using a small keyboard, a keypad, microphone, using visual signals with a camera, or a touch screen.

As with memory 114, storage system 140 can be of any type of computerized storage capable of storing information accessible by the server computing devices 110, such as a hard-drive, memory card, ROM, RAM, DVD, CD-ROM, write-capable, and read-only memories. In addition, storage system 140 may include a distributed storage system where data is stored on a plurality of different storage devices which may be physically located at the same or different geographic locations. Storage system 140 may be connected to the computing devices via the network 150 as shown in FIG. 1 and/or may be directly connected to any of the computing devices 110, 160, 170.

Storage system 140 may store images and associated information such as image identifiers, orientation, location of the camera that captured the image, intrinsic camera settings (such as focal length, zoom, etc.), depth information, as well as references to other, target images. Storage system 140 may also include information used for processing live imagery received by the one or more servers 110 from the image capture device 190. For example, the storage system 140 may include data associated with previously identified spam, such that the data can be used to identify and filter spam from the live imagery.

The image capture device 190 may be a camera, such as a video camera, or any other device capable of capturing images of a particular geographical location. According to one example, the image capture device 190 is a 360 degree video camera, which continually captures a 360 degree field of view around itself. According to another example, multiple image capture devices may be deployed at one geographical location. The image capture device may be positioned at the geographical location in such a way as to prevent or mitigate potential tampering with it. According to some examples, the image capture device 190 is positioned at geographical locations selected based on popularity. For example, the one or more computing devices 110 may determine geographical locations for which map data and/or imagery are most often requested by users, and image capture devices 190 may be placed at those determined locations.

Example Methods

Using the system described above, live imagery of geographical locations is provided to users upon request. The live imagery may be received at the one or more server computing devices from the image capture device and processed, for example, to remove personal information, such as faces and license plates numbers, and filter spam. The live imagery can include 360 degree panoramas. Users can request map data and imagery for the geographical location, and receive the processed live imagery in response. The users may also specify a particular point of view, and a corresponding portion of the 360 degree panorama is provided.

Figure 3:
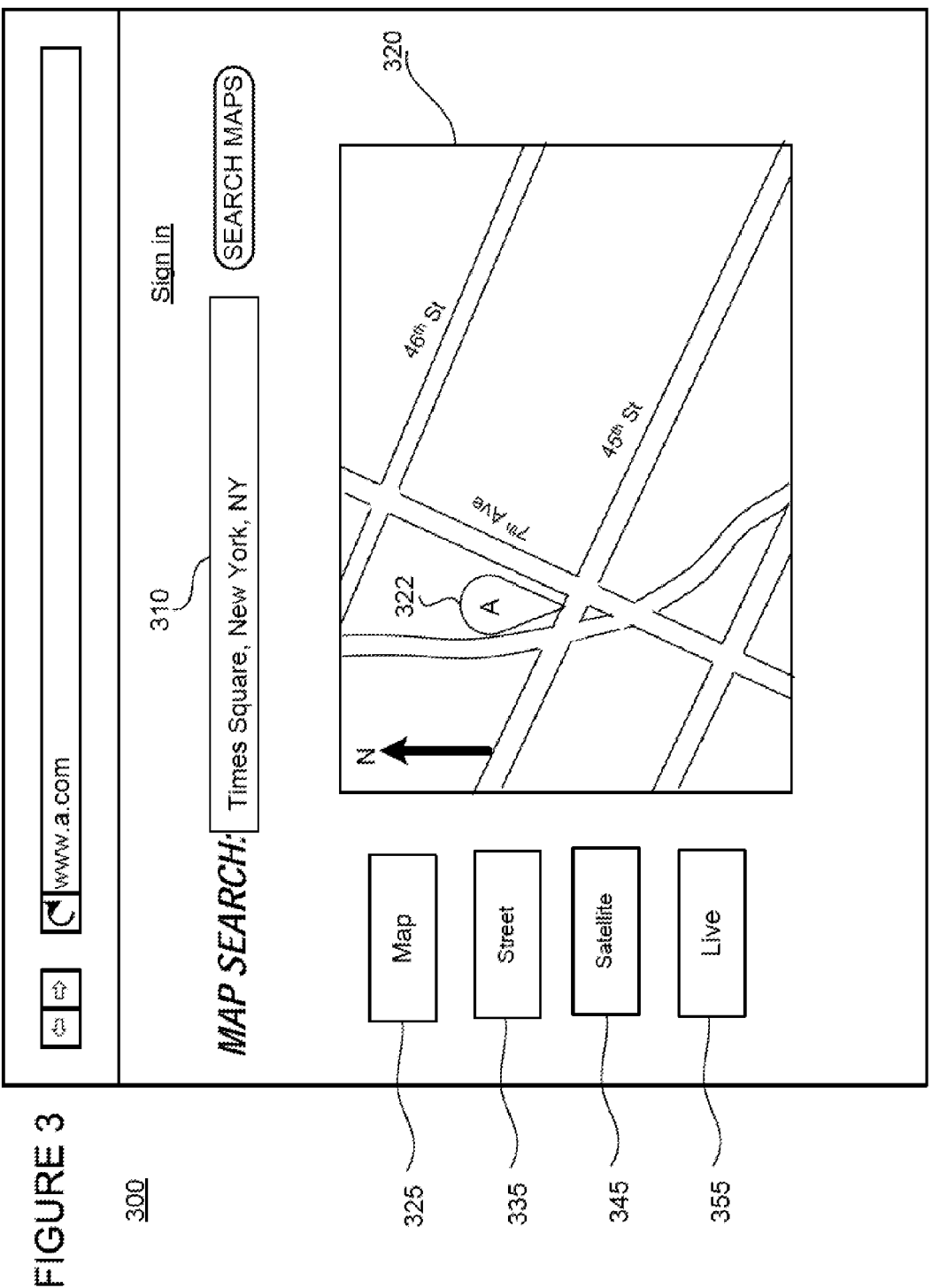
FIG. 3 is an example screen shot in accordance with aspects of the disclosure.

FIG. 3 illustrates an example screenshot 300 providing map information for a given geographical location corresponding to an address entered in search field 310. The map information includes, for example, a roadgraph 320. A place marker 322 may indicate a position on the roadgraph 320 corresponding to the entered location. View option buttons 325, 335, 345, 355 are also provided, wherein each button provides an option for a different representation of the geographical location. For example, the map button 325 may correspond to a roadgraph, such as the roadgraph 320. The street button 335 may correspond to still imagery of the geographical location taken from a perspective of someone standing at street level. The satellite button 345 may correspond to satellite imagery, showing a view of the geographical location from space. The live button 355 may correspond to live imagery captured by an image capture device dedicated to obtaining imagery of the specified geographical location, such as the image capture device 190 (FIGS. 1-2).

Figure 4:
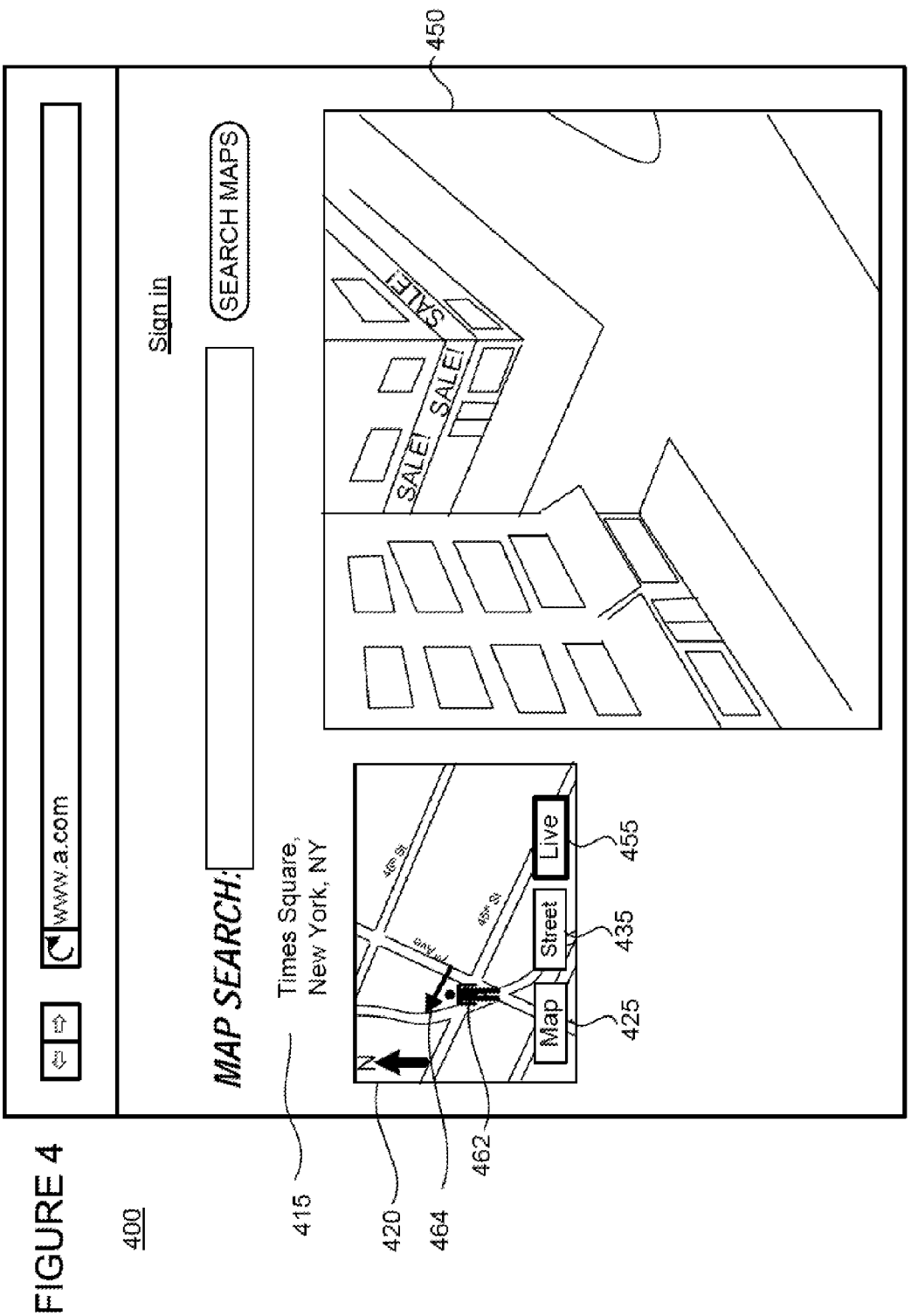
FIG. 4 is another example screen shot in accordance with aspects of the disclosure.

FIG. 4 illustrates an example screenshot 400 illustrating an example of the live imagery associated with the specified geographical location and provided to the user. For example, the geographical location corresponding to address 415 is depicted by roadgraph 420, on which a position viewpoint indicator 462 and a directional viewpoint indicator 464 is placed. Live imagery appearing in viewing field 450 corresponds to the address 415 and the roadgraph 420. The live images may be viewed by the user, for example, by selecting live view button 455 among option buttons 425, 435, 455. The images provided in viewing field 450 may include a portion of images actually captured and provided to the server computing devices. For example, while the image capture device positioned at the geographical location may obtain images with a continuous 360 degree field of view, only a segment of such field of view may be shown in viewing field 450. That segment corresponds to a position and direction of indicators 462, 464. According to other examples, the full images captured, such as the entire 360 degree field of view panorama, may be provided to the user in one or more viewing fields.

Figure 5:
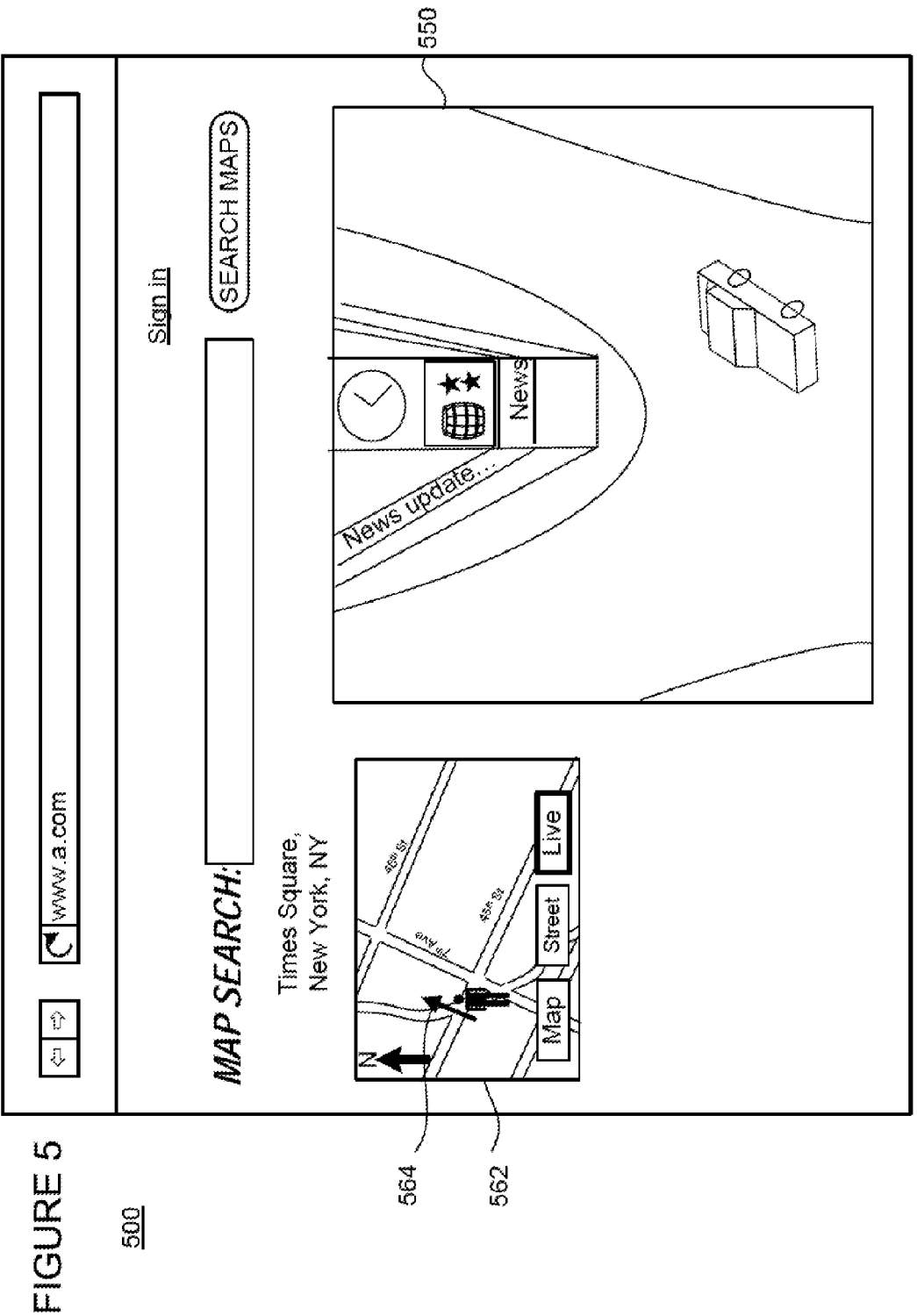
FIG. 5 is another example screen shot in accordance with aspects of the disclosure.

The position indicator 462 and directional indicator 464 may be manipulated by the user, for example, to receive images of a different viewpoint. FIG. 5 illustrates another example screenshot providing live imagery corresponding to a different view of the same geographical location as in FIG. 4. In particular, while position indicator 562 remains in the same position as position indicator 462 (FIG. 4), directional indicator 564 has been manipulated to point to a different direction, such as towards North. Accordingly, the live imagery provided in viewing field 550 shows a different area of the geographical location. According to the example where a 360 degree image capture device positioned at the location is providing the images, the images shown in the viewing field 550 may be another portion of the 360 degree panorama. In this regard, the user may repeatedly request different portions of the 360 degree frame. According to some examples, because the imagery provided in the viewing field 550 is live, objects in the imagery may appear to be moving. Moreover, the imagery may be continually updated as new images are received.

The imagery provided in FIGS. 4-5 is processed by one or more computing devices prior to being provided to users. For example, personal information and spam may be removed. As an example of removing personal information, an automatic face detection and blurring operation may be performed on the imagery. Similarly, license plate numbers and other personal information may be detected and blurred or otherwise obscured. As an example of spam filtering, spam such as people putting their faces close up to the camera or people holding up signs with slogans may be present in the received images. Such spam may be detected, for example, using face detection or text detection algorithms. Detected spam may be blurred in the images or obscured by a black box or other object. Thus, while the imagery is described as being "live," it should be understood that the imagery may actually be subject to a small delay, such as a few second to a few minutes. According to another example, images including detected spam may not be sent to users. For example, last available clean live imagery from the given geographical location, which does not include spam, can be provided. In some instances, such last available clean images can be provided with a timestamp or note indicating the delay.

According to one example, crowd-sourcing techniques may be used as part of the spam detection and filtering process. For example, users may submit reports identifying spam included in the live imagery for a given location. In response to receiving a predetermined number of reports for the given location, the last available clean images may be provided to users in place of the more recent images that include spam.

Figure 6:
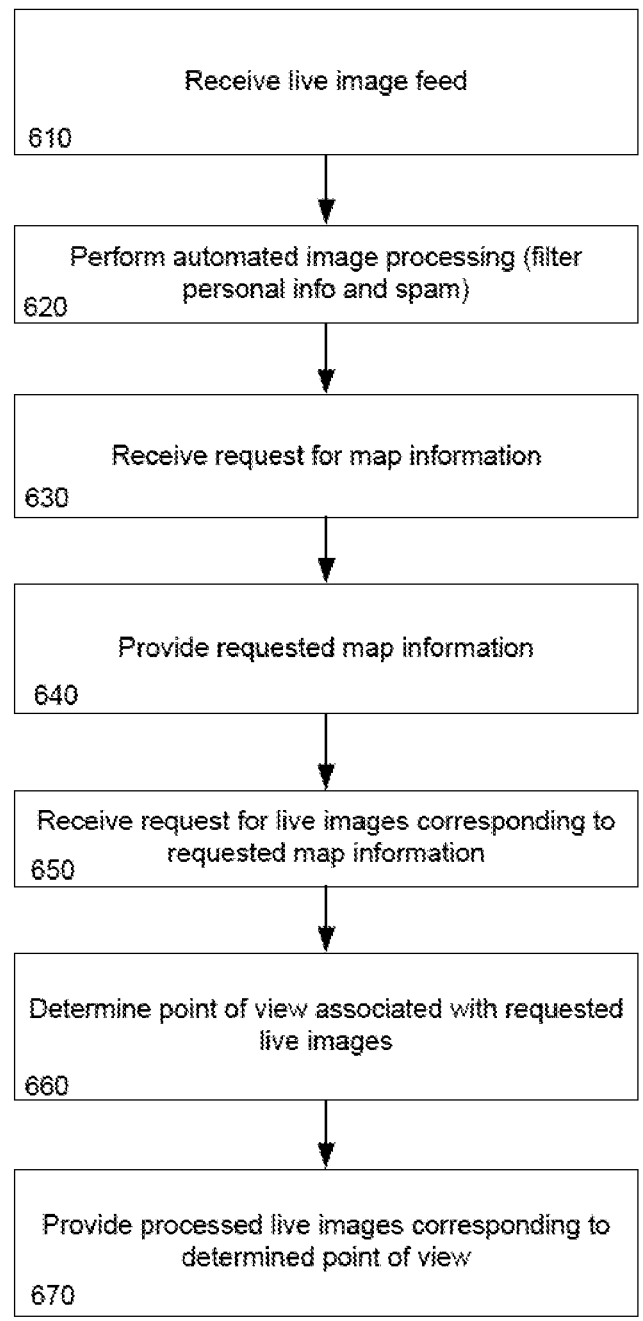
FIG. 6 is a flow diagram of an example method in accordance with aspects of the disclosure.

FIG. 6 provides a flow diagram illustrating an example method 600. The following operations do not have to be performed in the precise order described below. Rather, various steps can be handled in a different order or simultaneously. Steps can also be omitted unless otherwise stated.

In block 610, one or more computing devices receive live images of a geographical location from at least one image capture device. The at least one image capture device may be, for example, a 360 camera that continually captures images in directions all around a vertical axis. Such image capture devices may be positioned at selected geographical locations throughout the world. According to one example, the geographical locations may be selected by determining the locations for which imagery and/or map data is most often requested by users.

In block 620, the received live images may be processed, for example, to remove personal information and filter spam. For example, the one or more server computing devices may automatically detect objects such as faces, license plates, etc. Once detected, the received imagery may be modified to obscure those objects. For example, the detected objects may be blurred, covered, or the like. Spam may affect the received images in various ways. For example, it may be determined that images from an unauthorized image capture device or other unauthorized content are being received in addition to or in place of approved images. Such spam may be automatically filtered using any of a number of techniques.

In block 630, a request for map data corresponding to the geographical location is received by the one or more computing devices. For example, a user may enter an address, point of interest, or other relevant information in a search field of an interface. In response, the requested map data is provided to the user (block 640). For example, an address and/or a roadgraph or other depiction of the geographical location may be provided.

In block 650, a request for live imagery corresponding to the requested map data is received. For example, the user may select an option to view live imagery from among several other types of views. Further, the user may identify in the request a specific area of the geographical location to view. For example, the user may identify position and/or directional information associated with the requested imagery. Such information may be indicated by the user by manipulating icons, entering text, providing speech commands, navigating through a depiction of the location, or the like.

In block 660, a point of view associated with the requested live image is determined based on the request for live imagery. For example, the one or more computing devices may determine from information received from the user which specific area of the geographical location the user would like to see live.

In block 670, processed live images corresponding to the determined point of view and the requested map information are provided to the user. For example, a portion of the captured 360 degree panorama may be to the user, wherein the provided portion corresponds to the position and direction specified in the user's request. According to another example, the full 360 degree panorama may be provided in one or more viewing fields. Because the imagery is continually captured, the imagery provided to the user may be continually updated.

The above described features may be advantageous in that they provide users with the most up to date information regarding a specified location. For example, users can become informed about weather, traffic, construction, events, or other details associated with a geographic location. Such information may be more reliable than other sources of the same information, because the users can view it first hand, regardless of their current location. Using such information, users can make decisions about visiting the geographic location, or just become better educated about it.

As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted

The invention claimed is:

1. A computer-implemented method comprising:
receiving, by one or more computing devices, live images of a geographical location from at least one image capture device, the received live images including a 360 degree field of view around the at least one image capture device;
processing, by the one or more computing devices, the received live images, wherein the processing includes automatically detecting and obscuring personal information from the received live images;
receiving, by the one or more computing devices, a request for map data corresponding to the geographical location;
providing, by the one or more computing devices, the requested map data;
receiving, by the one or more computing devices, a request for live imagery corresponding to the requested map data;
determining, by the one or more computing devices and based on the request for live imagery, a point of view associated with the requested live images; and
providing, by the one or more computing devices, processed live images corresponding to the determined point of view and the requested map information.

2. The method of claim 1, further comprising:
determining, using the one or more computing devices, geographical locations for which imagery is most often requested by users; and
positioning the image capture device at the determined geographical location.

3. The method of claim 1, wherein obscuring the detected personal information comprises blurring the detected personal information.

4. The method of claim 3, wherein the personal information includes at least one of human faces and license plate numbers.

5. The method of claim 1, wherein processing the received live images comprises filtering spam data.

6. The method of claim 1, wherein:
receiving the request for live imagery corresponding to the requested map data includes receiving at least one of position and direction information associated with the requested imagery; and
determining the point of view associated with the requested live images is based on the at least one of position and direction information.

7. The method of claim 1, wherein the live images of the geographical location are continually received from the at least one image capture device and processed, and the processed live images corresponding to the determined point of view and requested map information are continually updated.

8. A system comprising:
at least one image capture device positioned at a geographical location;
one or more processors in communication with the image capture device, the one or processors programmed to:
receive live images of a geographical location from at least one image capture device, the received live images including a 360 degree field of view around the at least one image capture device;
process the received live images, wherein the processing includes automatically detecting and obscuring personal information from the received live images;
receive a request for map data corresponding to the geographical location;
provide the requested map data;
receive a request for live imagery corresponding to the requested map data;
determine, based on the request for live imagery, a point of view associated with the requested live images; and
provide processed live images corresponding to the determined point of view and the requested map information.

9. The system of claim 8, wherein the one or more processors are further programmed to determine geographical locations for which imagery is most often requested by users, and wherein the at least one image capture device is positioned at the determined geographical location.

10. The system of claim 8, wherein obscuring the detected personal information comprises blurring the detected personal information.

11. The system of claim 10, wherein the personal information includes at least one of human faces and license plate numbers.

12. The system of claim 8, wherein processing the received live images comprises filtering spam data.

13. A non-transitory computer-readable medium storing information and instructions executable by a processor for performing a method of providing live imagery, the method comprising:
receiving live images of a geographical location from at least one image capture device, the received live images including a 360 degree field of view around the at least one image capture device;
processing the received live images, wherein the processing includes automatically detecting and obscuring personal information from the received live images;
receiving a request for map data corresponding to the geographical location;
providing the requested map data;
receiving a request for live imagery corresponding to the requested map data;
determining, based on the request for live imagery, a point of view associated with the requested live images; and
providing processed live images corresponding to the determined point of view and the requested map information.

14. The non-transitory computer-readable medium of claim 13, the method further comprising determining geographical locations for which imagery is most often requested by users, wherein the image capture device is positioned at the determined geographical location.

15. The non-transitory computer-readable medium of claim 13, wherein obscuring the detected personal information comprises blurring the detected personal information.

16. The non-transitory computer-readable medium of claim 15, wherein the personal information includes human faces and license plate numbers.

17. The non-transitory computer-readable medium of claim 13, wherein processing the received live images comprises filtering spam data.

* * * * *